(12) United States Patent
Kim et al.

(10) Patent No.: US 8,179,452 B2
(45) Date of Patent: May 15, 2012

(54) METHOD AND APPARATUS FOR GENERATING COMPRESSED FILE, AND TERMINAL COMPRISING THE APPARATUS

(75) Inventors: Tae Yoon Kim, Seoul (KR); Sung-Min Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 12/637,527

(22) Filed: Dec. 14, 2009

(65) Prior Publication Data

US 2010/0165117 A1     Jul. 1, 2010

(30) Foreign Application Priority Data

Dec. 31, 2008    (KR) .................. 10-2008-0137884
Oct. 8, 2009    (KR) .................. 10-2009-0095765

(51) Int. Cl.
     *H04N 9/68*      (2006.01)
     *H04N 5/222*      (2006.01)
     *H04N 5/217*      (2006.01)
     *G06K 9/46*      (2006.01)

(52) U.S. Cl. ............... 348/234; 348/333.01; 348/241; 382/239

(58) Field of Classification Search ............ 348/207.99, 348/222.1, 227.1, 234, 239, 241; 382/233, 382/239

See application file for complete search history.

(56) References Cited

U.S. PATENT DOCUMENTS

| | | | |
|---|---|---|---|
| 6,928,185 B2 * | 8/2005 | Yonezawa | 382/149 |
| 7,030,358 B2 * | 4/2006 | Misawa | 250/208.1 |
| 7,301,566 B2 | 11/2007 | Nakami et al. | |
| 7,929,797 B2 * | 4/2011 | Matsuzaka | 382/274 |
| 2005/0147318 A1 * | 7/2005 | Park et al. | 382/266 |
| 2007/0092137 A1 | 4/2007 | Zhao et al. | |

FOREIGN PATENT DOCUMENTS

| | | |
|---|---|---|
| EP | 1581008 | 9/2005 |
| WO | 91/14334 | 9/1991 |

OTHER PUBLICATIONS

Y.H. Jung et al., "Design of Real-Time Image Enhancement Preprocessor for CMOS Image Sensor," IEEE Transactions on Consumer Electronics, vol. 46, No. 1, Feb. 2000, XP-002573312.

S. Okada et al., "System on a Chip for Digital Still Camera," IEEE Transactions on Consumer Electronics, vol. 45, No. 3, Aug. 1999, XP-011083775.

* cited by examiner

*Primary Examiner* — Nicholas Giles
(74) *Attorney, Agent, or Firm* — Lee, Hong, Degerman, Kang & Waimey

(57) ABSTRACT

An aspect of a method and apparatus for generating a compressed image file, and a terminal including the apparatus is receiving frame data comprising encoded image data of at least one frame of a raw image, generating first encoded thumbnail image data of the encoded image data, correcting the encoded image data and generating the compressed image file by using the corrected image data and the first encoded thumbnail image data when the encoded image data has an illuminance value lower than a preset reference value, and generating the compressed image file by using the encoded image data and the first encoded thumbnail image data when the encoded image data has an illuminance value greater than the preset reference value.

28 Claims, 14 Drawing Sheets

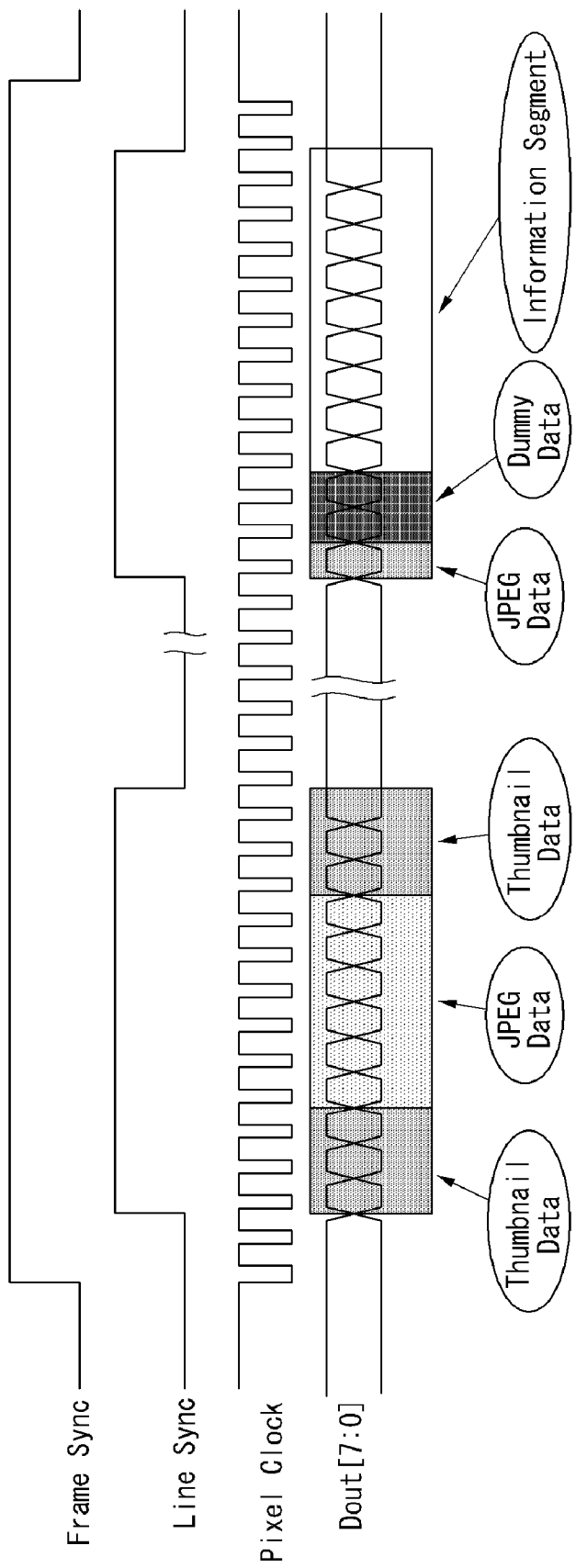

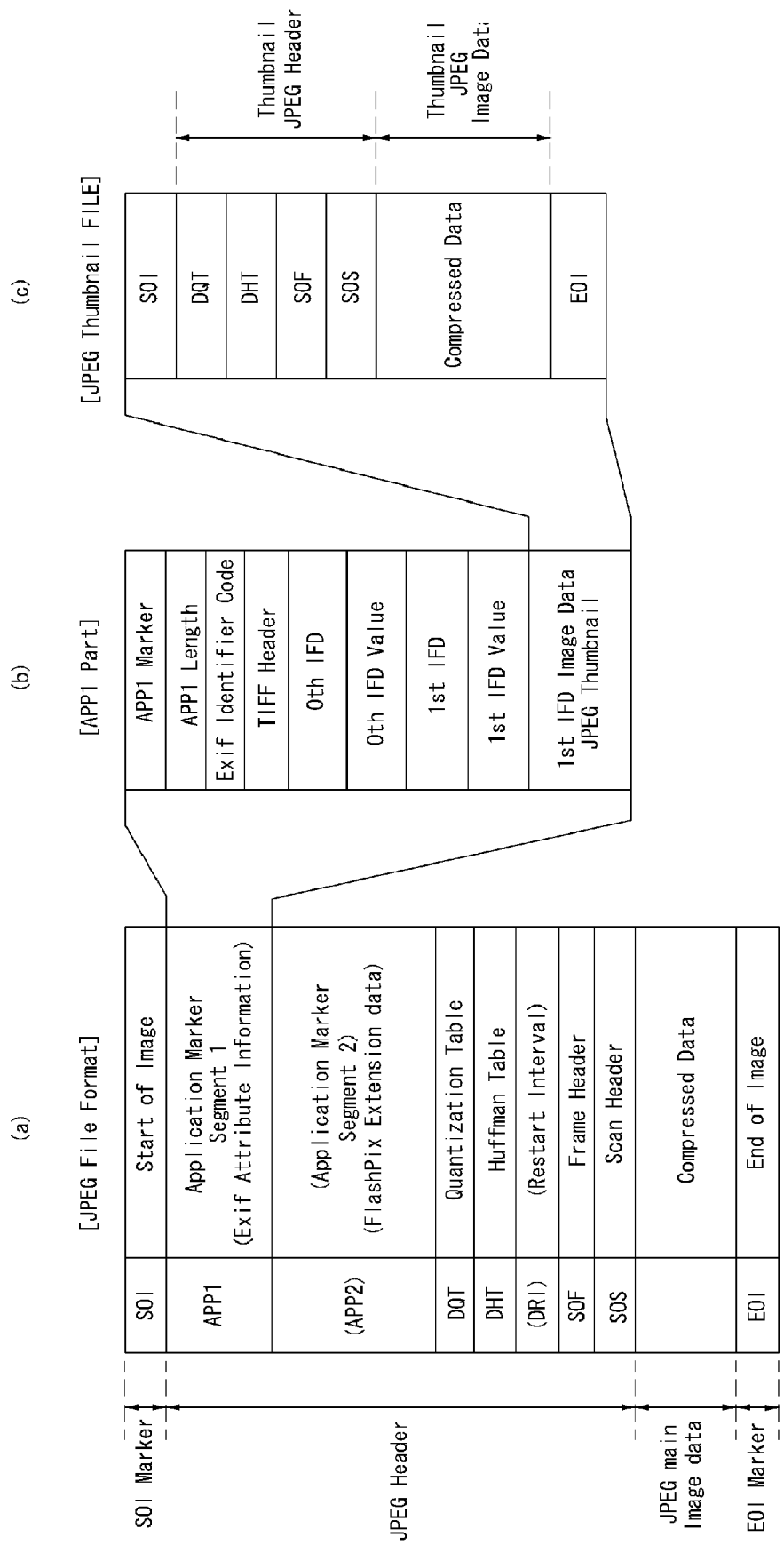

METHOD AND APPARATUS FOR GENERATING COMPRESSED FILE, AND TERMINAL COMPRISING THE APPARATUS

CROSS-REFERENCES TO RELATED APPLICATIONS

This application claims the benefit of Korean Patent Application No. 10-2009-0095765 filed on Oct. 8, 2009, and Korean Patent Application No. 10-2008-0137884 filed on Dec. 31, 2008, which are hereby incorporated by reference.

BACKGROUND

1. Technical Field

This document relates to image processing and, more particularly, to a method and apparatus for generating a compressed file, and a terminal comprising the apparatus.

2. Related Art

With the recent rapid technological development in the field of digital signal processing, the field of applications to digital images is greatly expanding. Further, with the development of digital communication and the proliferation of multimedia applications, there is an increasing demand for digital image processing technology.

In particular, in video signals, image compression technology for efficient transmission or storage of digital images is a requisite because a large quantity of data has to be processed.

Typical examples of such image compression technology are Joint Photographic Experts Group (JPEG) and Moving Picture Experts Group (MPEG). JPEG is the standard for image compression technology relating to a still image, and MPEG is the standard relating to moving image compression technology.

It has been known that JPEG (i.e., standard relating to still image compression technology) is chiefly suitable for electronic devices, requiring the display of high-picture quality and high resolution, because it has excellent data compression efficiency and can represent a variety of colors. JPEG is also advantageous in that the quality of an image and the size of the image file can be controlled when the image is created. Most of recent electronic devices adopt the JPEG standard as a method of compressing a still image because of the above advantages. According to a tendency requiring an image of a higher-picture quality and higher resolution, there is a need for a method capable of compressing a large quantity of image data at high speed with high efficiency.

It is recently a general tendency that a camera module with a high picture quality and high resolution of 100 million pixels or more is mounted on a variety of general electronic devices other than an image-capturing electronic device (e.g., a digital still camera) having image capturing as its main object. In particular, in mobile terminals such as a notebook computer and a portable phone, such functions as photographing or capturing and play of a moving image are ones of the supplementary functions that are widely used by a user. Accordingly, the camera module is being considered as a requisite component that should be mounted on the electronic devices.

However, in general, mobile devices and small-sized electronic devices, such as portable phones, have low data processing ability or low efficiency or both, and a slow processing speed as compared with image-capturing electronic devices, large-sized electronic devices, and fixed terminals. Nevertheless, conventional mobile devices and small-sized electronic devices are adopting an image compression method for the image-capturing electronic devices, the large-sized electronic devices, and the fixed terminals (i.e., image compression processing based on a host system within a device) (refer to FIG. 2)). In this case, there are problems that compression efficiency and the speed are lowered and data processing load is increased. Accordingly, there is an urgent need for a method and technology for generating a compressed file, which can be specialized for mobile devices and small-sized electronic devices.

SUMMARY

An aspect of this document is to provide a method and apparatus for generating a compressed image file, and a terminal comprising the apparatus. It is contemplated that an aspect of the method and apparatus includes receiving frame data comprising encoded image data of at least one frame of a raw image, generating first encoded thumbnail image data of the encoded image data, correcting the encoded image data and generating the compressed image file by using the corrected image data and the first encoded thumbnail image data when the encoded image data has an illuminance value lower than a preset reference value, and generating the compressed image file by using the encoded image data and the first encoded thumbnail image data when the encoded image data has an illuminance value greater than the preset reference value.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 13 is a diagram illustrating a method of the camera module shown in FIG. 6 outputting the frame data; and FIG. 14 is a diagram showing the formats of a thumbnail JPEG image file, a JPEG header, and a JPEG image file created according to an embodiment of this document.

DETAILED DESCRIPTION

Figure 1:
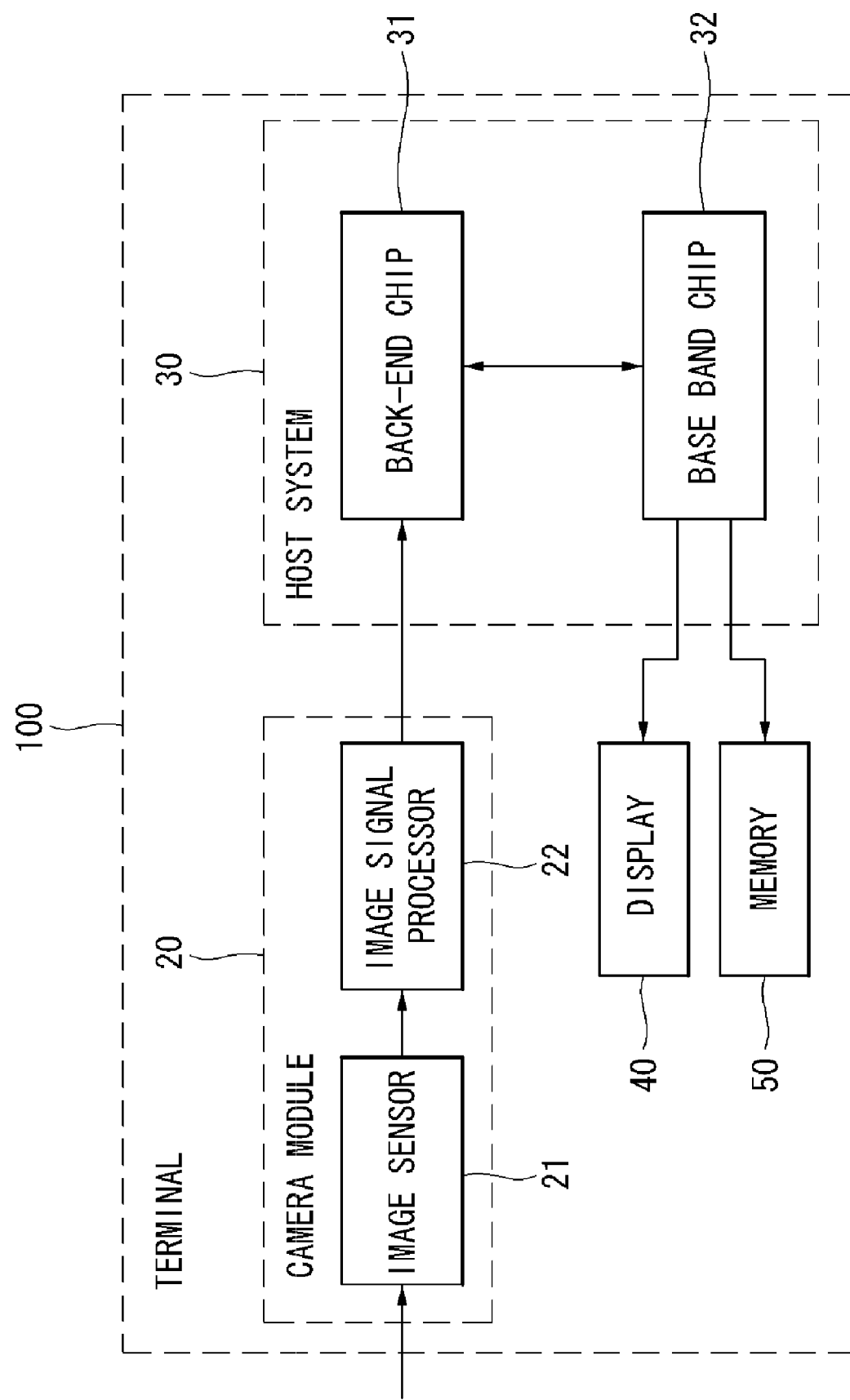
FIG. 1 is a related technology to which this document can be applied and is a block diagram schematically showing the structure of a terminal comprising a camera module and a host system.

Reference will now be made in detail embodiments of this document examples of which are illustrated in the accompanying drawings.

The above objects, characteristics, and merits of this document will become more apparent from the following detailed description taken in conjunction with the accompanying drawings. This document can be modified in various ways and can have several embodiments. Hereinafter, some of the embodiments are shown in the accompanying drawings and described in detail with reference to the drawings. The same reference numerals, as a general rule, designate the same elements throughout the drawings. Further, a detailed description of the known functions or constructions will be omitted if it is deemed to make the gist of this document unnecessarily vague. It is also to be noted that numbers (e.g., first and second) used in the description of this document are only identification symbols for distinguishing one element from the other element.

It is to be noted that the suffixes of elements used in the following description, such as 'module' and 'unit,' are assigned or mixed in use by taking only easiness to write this document into consideration, but are not particularly given importance and roles.

It is to be understood that a terminal described in the specification may comprise fixed terminals, such as digital TV and a desktop computer, other than mobile terminals (or handheld terminals), such as a mobile phone, a smart phone, a laptop computer, a terminal for digital broadcast, a personal digital assistant (PDA), a portable multimedia player (PMP), and a navigator.

Hereinafter, some embodiments of this document are described in detail with reference to the accompanying drawings.

This document is described below by taking JPEG (i.e., representative still image compression technology) as an example throughout the specification. It is, however, evident that this document can also be applied to other still image compression technologies (e.g., GIP, BMP, and TIF) and moving image compression technologies (e.g., MPEG) to which the same or similar technical spirit is applied.

Further, a case where frame data comprising compressed image data are generated by a camera module and then inputted to the host system of a terminal is hereinafter described as a typical example in this document. It is, however, to be understood that this document is not limited to the above case where the compressed image data are generated by the camera module and then inputted to the host system of a terminal. For example, in an apparatus and method for generating a compressed file according to some embodiments of this document, compressed image data (or frame data comprising the compressed image data) generated and outputted by a third apparatus outside the host system or the terminal other than the camera module may be inputted and then generated as a compressed image file. Further, a case where the subject that generates the compressed image data and the subject that generates the frame data comprising the compressed image data are identical with each other is hereinafter described as a typical example. It is, however, to be noted that the subject that generates the compressed image data may differ from the subject that generates frame data of a specific format comprising the compressed image data.

A case where data other than the compressed image data are included in the frame data is described below as a typical example. It is, however, to be noted that the compressed image data itself may be the frame data. That is, only the compressed image data may be included in the frame data.

As a premise to help clear understanding of this document, related technologies to which this document may be applied are first described with reference to FIG. 1. A conventional JPEG image compression method which may be compared with this document is then described with reference to FIG. 2.

Some embodiments of this document are described below with reference to FIGS. 3 to 14. Here, the construction of a camera module, the construction of an apparatus for generating a compressed file, and a method of generating a compressed file according to an embodiment of this document are described with referenced to FIGS. 3 to 5. The construction of a camera module, the construction of an apparatus for generating a compressed file, and a method of generating a compressed file according to another embodiment of this document are described with referenced to FIGS. 6 to 8. The construction of a camera module, the construction of an apparatus for generating a compressed file and a method of generating a compressed file according to yet another embodiment of this document are described with referenced to FIGS. 9 to 11. Accordingly, a terminal comprising the camera module (refer to FIGS. 3, 6, and 9) and the apparatus for generating a compressed file (refer to FIGS. 4, 7, and 10) according to this document can be evidently deduced.

Hereinafter, this document is sequentially described according to the above sequence.

FIG. 1 is a related technology to which this document can be applied and is a block diagram schematically showing the structure of a terminal comprising a camera module and a host system.

Hereinafter, all the contents except the contents relating to the prior art particularly shown in FIG. 2, from among the contents to be described with reference to FIG. 1, can be applied to this document without any change.

It is first to be noted that constituent elements to be described in the specification are classified according to the major roles of pertinent constituent elements or according to the general functions of pertinent constituent elements based on general common sense in the art.

That is, two or more constituent elements to be described later may be integrated into one constituent element, and one constituent element to be described later may be classified into two or more constituent elements according to their functions. Furthermore, each of the constituent elements to be described later may further perform part of the function or the entire function of other constituent element as well as its own main function, and part of the main function or the entire function of each of the constituent elements to be described later may be fully performed by other constituent element.

For example, referring to FIG. 1, an image sensor 21 and an image signal processor 22, and a back-end chip 31 and a base band chip 32 are illustrated to be precisely separated from each other physically or functionally. However, this is only for easy of distinction between the constituent elements, for convenience of drawing. In particular, according to a recent trend toward multi-function/convergence and small size, for example, part of the function or the entire function of the image signal processor 22 may be included in the function of the image sensor 21, or both the functions of the image signal processor 22 and the image sensor 21 may be implemented in a single chip (e.g., system on chip (SOC). The same principle may apply to between-the back-end chip 31 and the base band chip 32. For example, part of the function or the entire function of the back-end chip 31 to be described later with reference to FIG. 2 may be implemented in the base band chip 32.

In a similar way, each of the constituent elements shown in FIG. 1 (this is true of FIGS. 3, 4, 6, 7, 9, and 10) needs not to be necessarily implemented in hardware, but may be implemented in software to perform the corresponding function.

Further, the terminal 100 shown in FIG. 1 may be an electronic device for image capturing, such as a digital still camera. Hereinafter, a case where the terminal 100 is an electronic device having a function (i.e., a mobile communication function) as a main object and also having a supplementary image capturing function, such as a mobile terminal, is described as a typical example.

Referring to FIG. 1, the terminal 100 comprises a camera module 20, a host system 30, a display 40, and memory 50. The camera module 20 comprises the image sensor 21 and the image signal processor 22, and the host system 30 comprises the back-end chip 31 and the base band chip 32. Here, the host system 30 is placed outside the camera module 20 and can be connected to the camera module 20 through a serial interface or a parallel interface.

The image sensor 21 receives light reflected from a subject and generates an electrical signal corresponding to the amount of the received light. A typical example of the image sensor 21 may be a charge coupled device (CCD) image sensor or a complementary metal oxide semiconductor (CMOS) image sensor.

In the case where a color filter having Bayer patterns is placed on the light-receiving surface of the image sensor 21, the image sensor 21 generates an analog signal comprising wavelength information of red (R), green (G), and blue (B). The RGB analog signal can be converted into an RGB digital signal by an analog to digital converter (ADC) (not shown).

The image signal processor (ISP) 22 converts the video signal (i.e., RGB image data), received from the image sensor 21, into image data of an YCbCr (or YUV) format. In the YCbCr (or YUV) method, the video signal is represented by data having brightness (Y) components and chrominance (C) components by taking notice that the human eyes are more sensitive to luminosity than to color. The image signal processor 22 can also perform pre-processing, such as inter-pixel interpolation, gamma correction for image data, and white balance control.

The data outputted from the camera module 20 may be inputted to the back-end chip 31 of the host system 30 through the serial or parallel interface.

The back-end chip 31 may be responsible for processing functions (e.g., encoding, decoding, and scaling) for the received image data under the control of the base band chip 32.

For example, the back-end chip 31 may encode the received image data according to a predetermined encoding method (e.g., JPEG or BMP) under the control of the base band chip 32. Here, the encoded image data may be stored in the memory 50 under the control of the base band chip 32. A conventional JPEG encoding method pertinent to the function of the back-end chip 31 is described later with reference to FIG. 2.

The back-end chip 31 may decode the encoded image data under the control of the base band chip 32. The decoded image may be displayed in the display 40 under the control of the base band chip 32. Further, the back-end chip 31 may scale the received image data according to the screen size of the display 40 under the control of the base band chip 32. Alternately, the back-end chip 31 may scale the received image data according to a thumbnail image size. The scaled image may also be displayed in the display 40 under the control of the base band chip 32.

The base band chip 32 performs a function of entirely controlling the operations of the camera module 20 and the back-end chip 31 in relation to the image capturing function and the image processing function.

A conventional JPEG encoding method as compared with the method and apparatus for generating a JPEG file and the camera module pertinent to the method and apparatus according to some embodiments of this document are described below in short.

Figure 2:
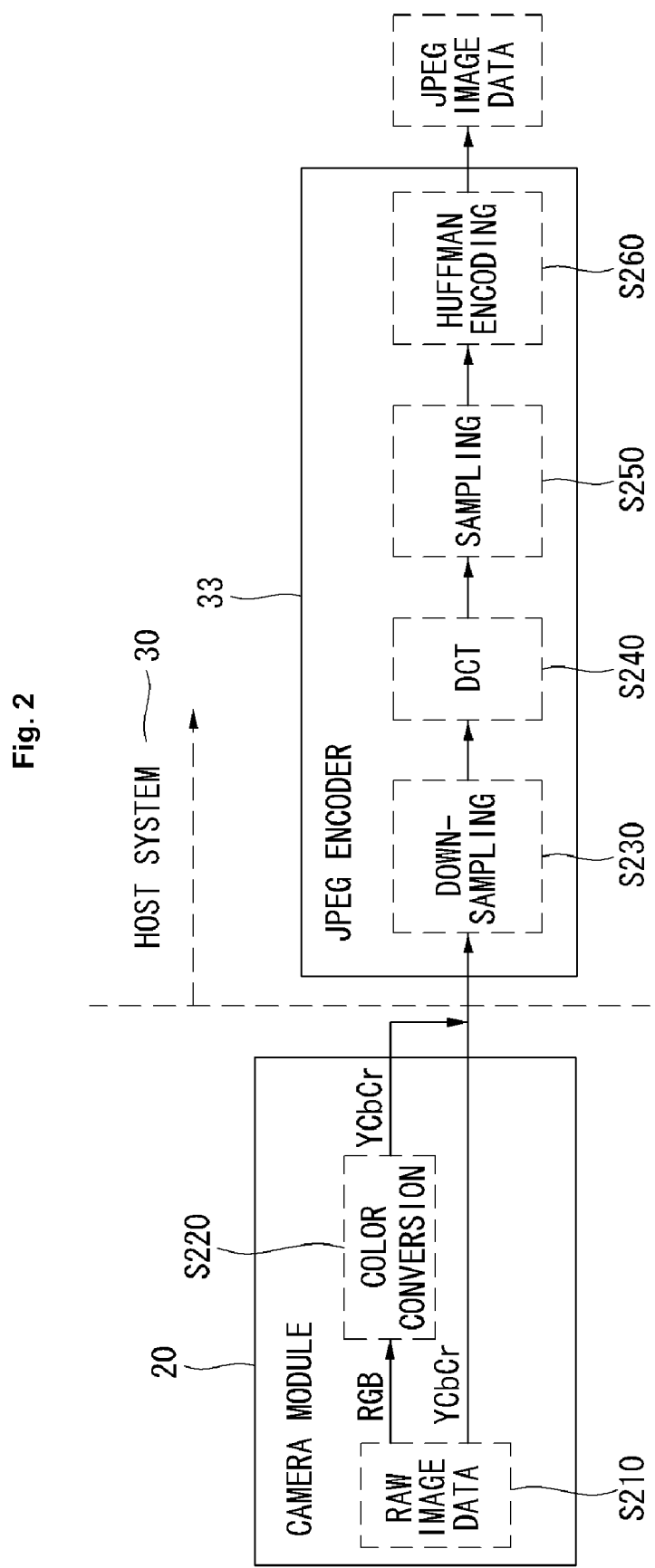
FIG. 2 is a diagram illustrating a conventional JPEG encoding method.

FIG. 2 is a diagram illustrating a conventional JPEG encoding method.

Prior to a description of problems inherent in the conventional JPEG encoding method, a typical JPEG encoding process is described as follows. The typical JPEG encoding process is known in documents regarding the JPEG standard, and so described in short in this document.

The JPEG encoding process, as shown in FIG. 2, chiefly includes down-sampling processing (S230), discrete cosine transform (DCT) processing (S240), quantization processing (S250), and Huffman encoding processing (S260). The JPEG encoding processing is based on a precondition that received image data have an YCbCr format. If acquired raw image data does not have the YCbCr format, color conversion processing (refer to S220) may be further included. The color conversion processing may be performed in the host system 30 unlike in FIG. 2.

When image data whose color has been converted into the YCbCr format is received, the down-sampling processing (S230) for entirely reducing the size of the received image data is performed. After the size of the image data is reduced through the down-sampling processing, blocking processing for classifying the image data into blocks of a certain amount is performed. In JPEG, blocking is carried out in an 8×8 matrix unit. The 8×8 matrix unit is the basic unit of JPEG compression.

In the DCT processing (S240), component data separated into brightness (Y) components and chrominance (C) components is represented by the sum of a cosine function and then transformed based on a mathematical transform formula called a discrete cosine transform. If such a DCT transform is performed, an image is separated into low frequency components and high frequency components. Here, the low frequency component means that there is almost no difference in the luminosity or color between neighboring pixels, and the high frequency component means that there is a great difference in the luminosity or color between neighboring pixels. Since the number of the low frequency components is larger than that of the high frequency components statistically, the picture quality is rarely affected although the high frequency components are removed. DCT performs compression based on this principle.

The quantization processing (S250) is performed to classify the image data on which the DCT processing has been performed into predetermined integer matrices called quantization matrices in order to reduce the amount of the image data. Image data can be transformed from the space domain to the frequency domain using DCT. If the quantization processing is properly performed, an excellent picture quality can be obtained at a high compression ratio.

The Huffman encoding processing (S260) is performed using Huffman codes. The Huffman codes are codes that realize the shortest mean code length for a probability distribution that a predetermined signal may occur. In the case where the probability distribution that a predetermined signal may occur is inclined toward one side, the entire amount of codes can be reduced using variable length codes in which a short code is assigned to a signal having a high probability of occurrence and a long code is assigned to a signal having a low probability of occurrence.

As described above, the JPEG encoding process composed of color transform, down-sampling, blocking, DCT, quantization, and Huffman encoding in this order can be essentially applied to this document without change.

Problems inherent in the conventional JPEG encoding method originate in that JPEG encoding regarding the main image of 1 frame acquired from the camera module 20 is performed by the host system 30 of the terminal 100. In other words, in the known art, the JPEG encoding method for generating JPEG image data is performed by the back-end chip 31 within the host system 30 or the JPEG encoder 33 within the base band chip 32.

According to the conventional technology, raw image data that is acquired from the camera module 20 without being compressed is accumulated in the frame buffer of the host system 30 and is then subject to JPEG encoding in the host system 30.

However, such a conventional JPEG encoding method gives a heavy load on the host system 30 of the terminal 100 and results in low compression efficiency and a slow processing speed. In image-capturing dedicated electronic devices such as a digital still camera, such a load may not be a significant problem. However, such a conventional JPEG encoding method can give a heavy load on the system resources of mobile terminals, small-sized electronic devices, and devices not the image-capturing dedicated electronic devices.

For example, in portable phones, a host system is implemented to process applications pertinent to a mobile communication function with the highest priority. Accordingly, if image data with a high picture quality, high resolution, or a high capacity continues to be accumulated in the frame buffer, the host system must consume lots of time and resources in order to compress and process the image data, which results in a significant problem.

Hereinafter, methods and apparatuses for generating a JPEG file, and camera modules and terminals related to the methods and apparatuses are described as solutions to the above problems. A camera module, and an apparatus and method for generating a JPEG file according to an embodiment of this document are described below with reference to, chiefly, FIG. 5 together with FIGS. 3 and 4. Here, a description of the contents which can apply like the previous description or overlap with those of the previous description is omitted, for simplicity.

Figure 3:
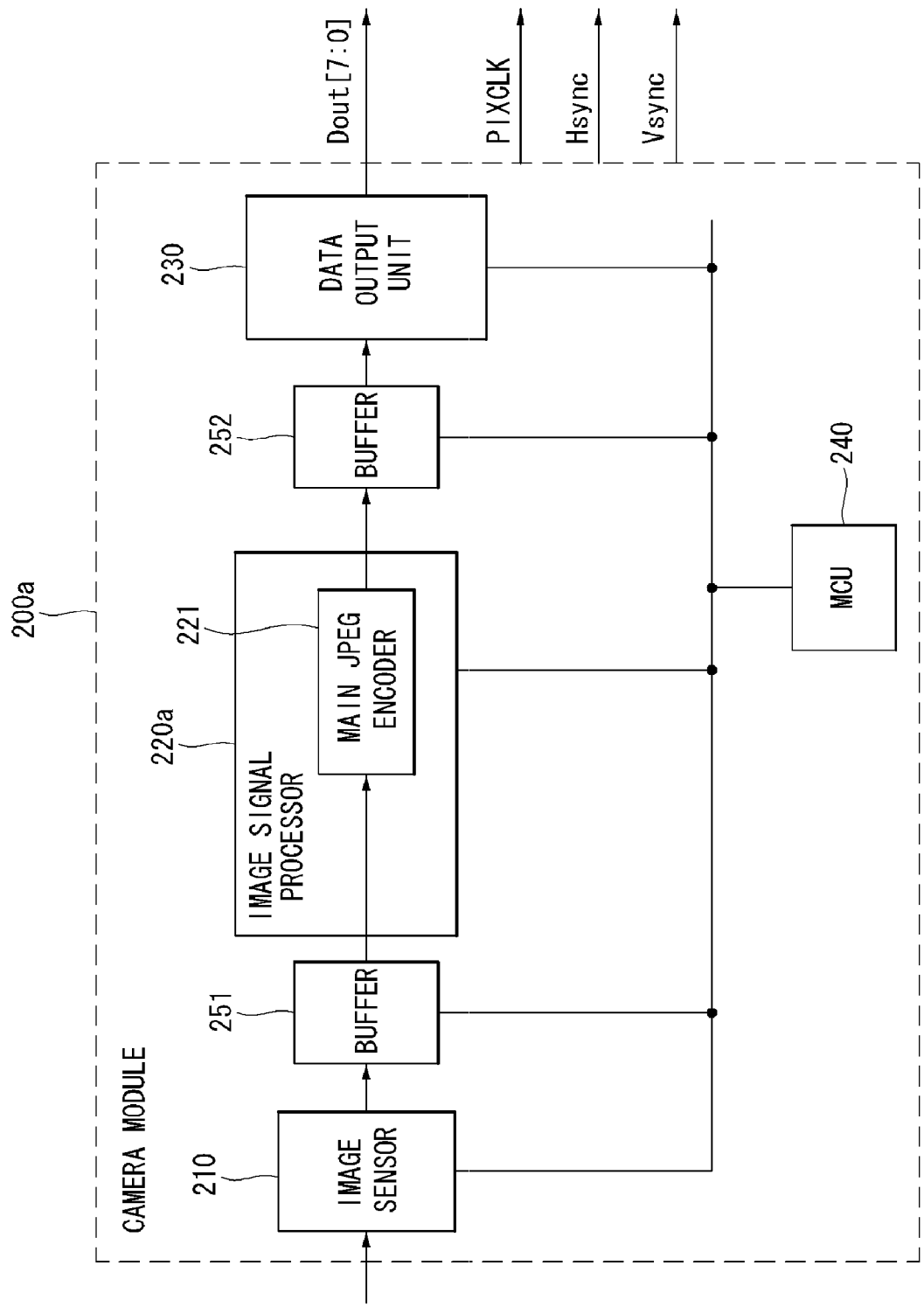
FIG. 3 is a block diagram of a camera module according to an embodiment of this document.
Figure 4:
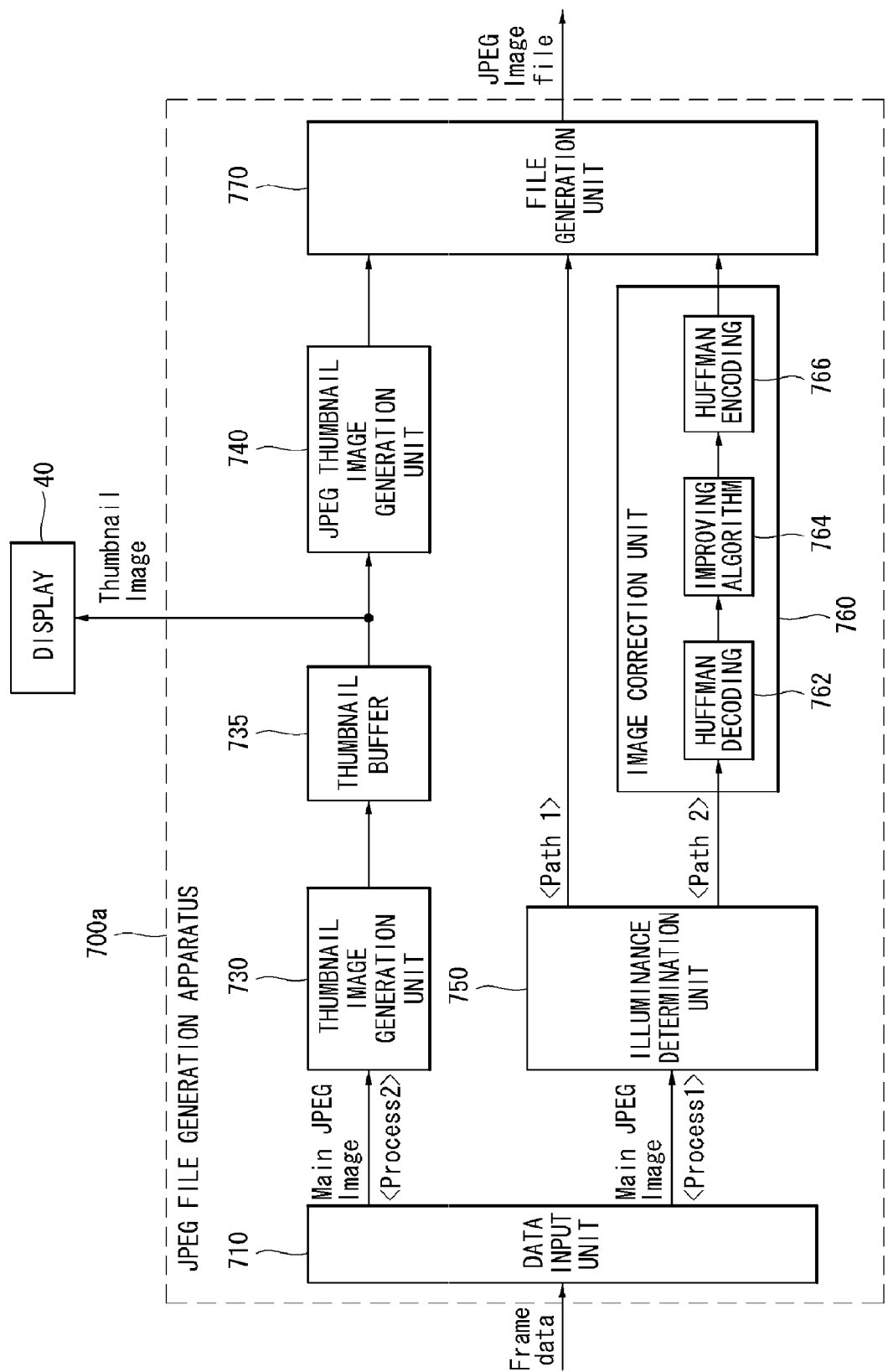
FIG. 4 is a block diagram of an apparatus for generating a JPEG file according to an embodiment of this document.
Figure 5:
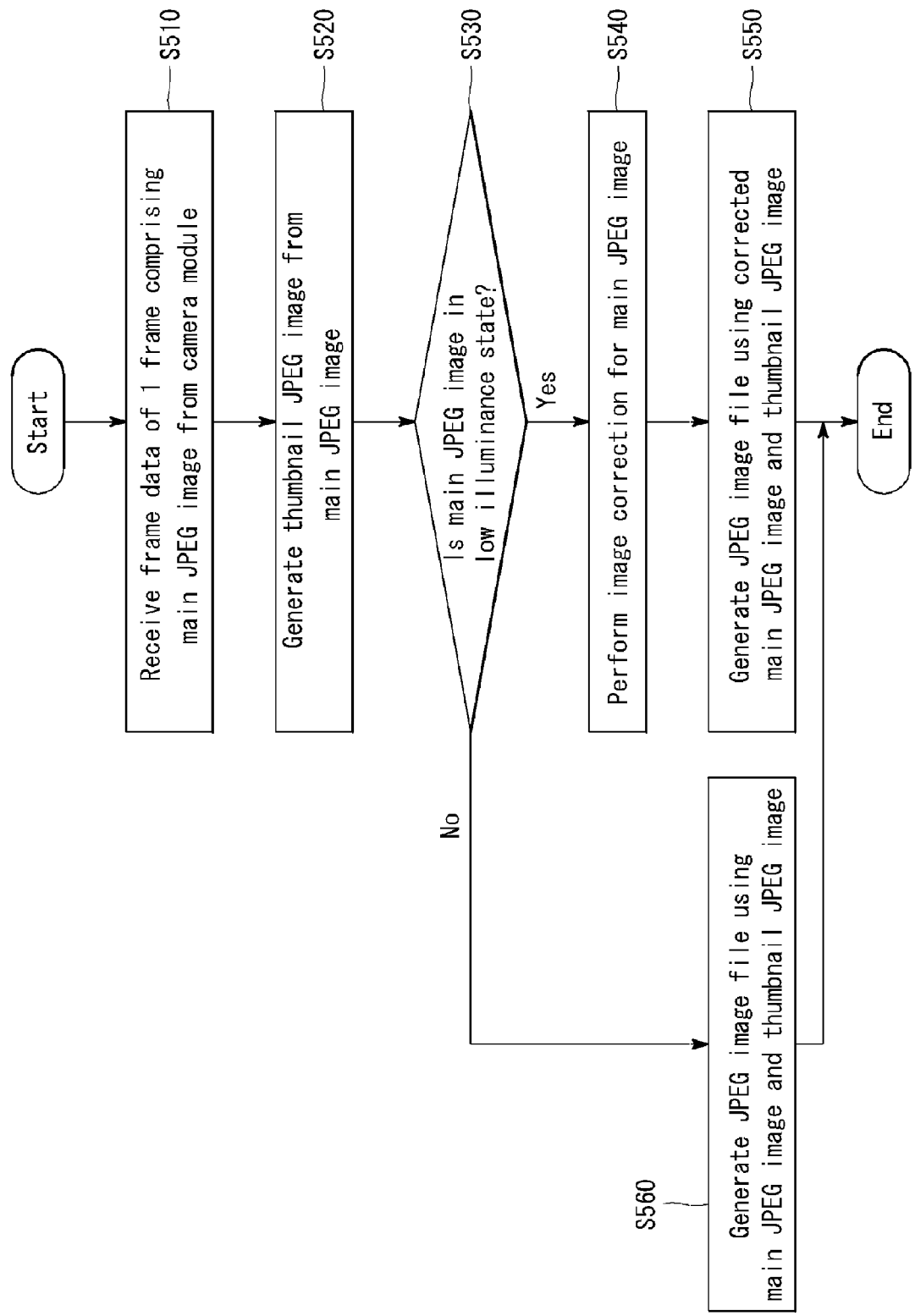
FIG. 5 is a flowchart illustrating a method of generating a JPEG file according to an embodiment of this document.

FIG. 5 is a flowchart illustrating the JPEG file generation method according to the embodiment of this document, FIG. 3 is a block diagram of the camera module according to the embodiment of this document, and FIG. 4 is a block diagram of the JPEG file generation apparatus according to the embodiment of this document.

The JPEG file generation apparatus 700a shown in FIG. 4 (i.e., an apparatus for implementing the JPEG file generation method shown in FIG. 5) may be included in a host system of the terminal. In more detail, the JPEG file generation apparatus according to the present embodiment or all the functions of the apparatus may be included in the base band chip of the host system. In an alternative, some of the functions of the JPEG file generation apparatus may be implemented within the base band chip, and some of the functions of the JPEG file generation apparatus may be implemented within the back-end chip. It will be evident that a variety of modifications are possible. The same principle applies to the JPEG file generation apparatuses according to the remaining embodiments of this document (refer to FIGS. 7 and 8, and FIGS. 10 and 11).

Referring to FIG. 5, the JPEG file generation apparatus receives frame data of 1 frame, comprising a main JPEG image, from the camera module 200a [S510].

According to the present embodiment, the frame data of 1 frame comprising the main JPEG image is generated by the camera module 200a and is then inputted to the JPEG file generation apparatus 700a. To this end, the camera module 200a may be configured, such as that shown in FIG. 3. The construction of the camera module 200a shown in FIG. 3 is described below in short.

Referring to FIG. 3, the camera module 200a according to the present embodiment comprises an image sensor 210, an image signal processor 220a equipped with a main JPEG encoder 221, a data output unit 230, a micro control unit (MCU) 240, and buffers 251 and 252.

Unlike in FIG. 3, the main JPEG encoder 221 may be provided separately from the image signal processor 220a. Further, the main JPEG encoder 221 and the image signal processor 220a need not to be necessarily implemented in hardware, but may be implemented in software.

The image sensor 210 captures an image of a subject and generates a video signal of 1 frame. The video signal outputted from the image sensor 210 may be an analog electrical signal having RGB wavelength information. For convenience of description, it is assumed that the image sensor 210 shown in FIG. 3 comprises an ADC and outputs RGB raw image data.

The RGB raw image data are inputted to the image signal processor 220a via the buffer 251 provided on the output stage of the image sensor 210.

Although not shown in FIG. 3, the image signal processor 220a may comprise additional storage means for temporarily storing the received RGB raw image data. The image signal processor 220a may further comprise a color conversion unit for converting the RGB raw image data into image data having an YCbCr (or YUV) format (hereinafter referred to as an 'YCbCr data'). The converted YCbCr raw image data are inputted to the main JPEG encoder 221.

The main JPEG encoder 221 generates JPEG image data from the received YCbCr raw image data. For distinction purposes, the JPEG image data generated from the raw image data of 1 frame is called a 'main JPEG image'.

Here, the JPEG encoding process of the main JPEG encoder 221 generating the main JPEG image is essentially identical with that described above with reference to FIG. 2. However, the JPEG encoding process according to this document quite differs from the conventional JPEG encoding method in that the camera module 200a directly performs the JPEG encoding process for the raw image data unlike in the prior art in which the JPEG encoding process is performed in the host system of the terminal.

Further, in the conventional JPEG encoding method, a heavy load is given to the host system within the terminal 100, resulting in the problems such as low compression efficiency, a slow processing speed, and an increased compression processing time. As in this document, however, when the JPEG encoding process for the raw image data is performed within the camera module 200a, compression efficiency can be improved and the processing speed can be enhanced as compared with the prior art.

The camera module 200a is optimally designed to perform events, such as acquiring, processing, storing, and sending an image. Accordingly, when the JPEG encoding process is directly performed within the camera module 200a, such improved effects as a reduced load on the host system and reduced system resources as well as the improved compression efficiency and the increased processing speed can be expected as compared with the prior art in which the JPEG encoding process is performed by the host system.

The main JPEG image outputted from the main JPEG encoder 221 is transferred to the data output unit 230 via the buffer 252.

Accordingly, the main JPEG image can be sent to the host system through the data output unit 230. Hereinafter, data which will be outputted to the host system via the data output unit 230 and is related to an acquired image of 1 frame is referred to as a 'frame data'. The frame data outputted from the data output unit 230 may have a specific transmission format. The transmission format of the frame data is described in more detail later with reference to FIG. 12.

Further, an interface connection between the camera module 200a and the host system, for transmitting the frame data to the host system, may use the existing interface connection method without need to change the structure of the camera module. For example, an interface connection between the camera module 200a and the host system may consist of, for example, a vertical synchronization signal (Vsync or Frame sync), a horizontal synchronization signal (Hsync or line sync), a pixel clock (PIXCLK), and a plurality of data lines Dout[7:0] (refer to FIG. 3). The same principle may apply to the embodiments of this document (refer to FIGS. 6 to 8 and FIGS. 9 to 11).

As described above, the frame data generated and transmitted by the camera module 200a and configured to comprise the main JPEG image can be inputted to the data input unit 710 of the JPEG file generation apparatus 700a, such as that shown in FIG. 4.

After the frame data comprising the main JPEG image is received from the camera module at step S510, the JPEG file generation apparatus 700a shown in FIG. 4 according to the present embodiment performs a series of the following processes in order to generate a JPEG image file.

As a first premise process (refer to <Process 2> shown in FIG. 4) for generating the JPEG image file, a thumbnail JPEG image is generated from the main JPEG image included in the received frame data [S520].

As a second premise process (refer to <Process 1> shown in FIG. 4) for generating the JPEG image file, it is determined whether the main JPEG image received from the camera module is in a low illuminance state [S530]. If, as a result of the determination, the main JPEG image is determined to be in a low illuminance state, image correction processing for the main JPEG image is performed [S540].

Here, the two premise processes (i.e., steps S520 and step S540) for generating the JPEG image file may be performed in parallel (i.e., at the same time) unlike in the sequence shown in FIG. 5.

Accordingly, if the main JPEG image received from the camera module is in a low illuminance state, the JPEG image file is finally generated using the thumbnail JPEG image generated at step S520 and the JPEG image on which the image correction processing has been performed at step S540 [S550]. However, if, as a result of the determination, the main JPEG image is determined not to be in a low illuminance state, the image correction processing at step S540 is not performed, and the JPEG image file is finally generated using the raw main JPEG image (i.e., the entire main JPEG image received from the camera module) and the thumbnail JPEG image generated at step S520 [S560].

As an embodiment for implementing the above JPEG file generation method, the construction of the JPEG file generation apparatus 700a shown in FIG. 4 is described below.

Referring to FIG. 4, the JPEG file generation apparatus 700a according to a embodiment of this document comprises a data input unit 710, a thumbnail image generation unit 730, a thumbnail buffer 735, a thumbnail JPEG image generation unit 740, an illuminance determination unit 750, an image correction unit 760, and a file generation unit 770. The JPEG file generation apparatus 700a may separately exist within a terminal, but may exist within a host system (in particular, within a base band chip).

In the JPEG file generation apparatus 700a according to the present embodiment, an overall process for generating a JPEG image file is as follows. When frame data comprising a main JPEG image is received from the camera module, the JPEG file generation apparatus 700a first stores the received frame data in memory.

After storing the frame data, the JPEG file generation apparatus 700a according to the present embodiment performs a process of generating a JPEG file based on two processes.

In one (hereinafter referred to as a 'first process', refer to <Process 1> shown in FIG. 4) of the two processes, it is determined whether the main JPEG image received from the camera module is in a low illuminance state (which is related to the function of the illuminance determination unit 750 shown in FIG. 4). If, as a result of the determination, the main JPEG image received from the camera module is determined to be in a low illuminance state, the image correction processing is performed on the main JPEG image according to <Path 2> shown in FIG. 4 (which is related to the function of the image correction unit 760 shown in FIG. 4). A JPEG image file is created based on the corrected main JPEG image. However, if, as a result of the determination, the main JPEG image received from the camera module is determined not to be in a low illuminance state, a JPEG image file is created based on the raw main JPEG image according to <Path 1> shown in FIG. 4.

In the other (hereinafter referred to as a 'second process', refer to <Process 2> shown in FIG. 4) of the two processes, the main JPEG image received from the camera module is decoded and scaled to thereby create a thumbnail image (which is related to the function of the thumbnail image generation unit 730 shown in FIG. 4). The thumbnail image is subject to JPEG encoding to thereby create a thumbnail JPEG image (which is related to the function of the thumbnail JPEG image generation unit 740 shown in FIG. 4).

There is an advantage in that the two processes in the JPEG file generation apparatus 700a according to the present embodiment are performed in parallel (i.e., at the same time).

Furthermore, according to the second process, the created thumbnail image has its color converted into an RGB format and then can be immediately displayed in the display 40 of the terminal 100. In the prior art, a thumbnail image is decoded from a JPEG image file that is finally produced (created) and is then displayed on a screen. In this document, however, a thumbnail image acquired during the process of generating the JPEG image file is immediately outputted on a screen. Accordingly, there are advantages in that the processing speed or a work load or both can be improved as compared with the prior art. This can apply to the remaining embodiments of this document in the same or similar way.

In order to perform the above operation, the data input unit 710 may comprise elements for receiving the frame data from the camera module; a data interface for receiving the frame data and memory for storing the received frame data.

The thumbnail image generation unit 730, the thumbnail buffer 735, and the thumbnail JPEG image generation unit 740 are elements for generating a thumbnail JPEG image (i.e., the first premise for generating a JPEG image file).

The thumbnail image generation unit 730 may comprise, for example, a JPEG decoder (not shown) and a scaler (not shown) and so can create a thumbnail image having a thumbnail image size from the main JPEG image. Here, the created thumbnail image may be stored in the thumbnail buffer 735 and may be displayed in the display (refer to 40 shown in FIG. 1) of the terminal under the control of the base band chip (refer to 32 shown in FIG. 1) of the host system.

The thumbnail JPEG image generation unit 740 creates a thumbnail JPEG image by performing JPEG encoding for the created thumbnail image. To this end, the thumbnail JPEG image generation unit 740 may comprise a JPEG encoder (not shown).

As described above, in the case of FIG. 4, the thumbnail image or the thumbnail JPEG image is created by processing the raw main JPEG image with it being included in the frame data and transferred therewith. It is, however, to be noted that the above example is only illustrative, and the thumbnail image or the thumbnail JPEG image may be created using another method. For example, it is evident that the thumbnail image or the thumbnail JPEG image is not created by processing the raw main JPEG image received from the camera module, but may be created by processing a JPEG image corrected and processed by the image correction unit 760.

The illuminance determination unit 750 determines whether the image correction processing has to be performed on the main JPEG image received from the camera module by determining whether the main JPEG image is in a low illuminance state lower than a preset reference value.

If, as a result of the determination, the received main JPEG image is determined to be in a low illuminance state, the illuminance determination unit 750 performs the image correction processing on the main JPEG image through the image correction unit 760. However, if, as a result of the determination, the received main JPEG image is determined not to be in a low illuminance state, the illuminance determination unit 750 does not perform the image correction processing using the image correction unit 760.

Illuminance refers to the luminosity of a subject and uses a unit called a 'lux'. 1 lux is defined when light impinges on a surface whose area is one square meter on the average.

The illuminance determination unit 750 may receive such illuminance information from the camera module or may directly calculate it from the received main JPEG image. For example, the camera module can acquire illuminance information in which external image-capturing environments have been reflected from the intensity of light incoming through an aperture stop. Since the illuminance information acquired by the camera module is transferred to the host system as described above, the illuminance determination unit 750 can use the received illuminance information. As another example, the illuminance determination unit 750 may comprise an illuminance calculation module (not shown) for calculating the illuminance information from an RGB value or an YCbCr value (in particular, a Y (brightness) value) of the received main JPEG image.

Accordingly, when an illuminance value of the main JPEG image received from the camera module is in a low illuminance state (i.e., a preset reference value or less (e.g., 75 lax)), the illuminance determination unit 750 transfers the main JPEG image to the image correction unit 760 (refer to <Path 2> shown in FIG. 4).

Here, the image correction unit 760 can apply an improving algorithm, including at least one of brightness enhancement, noise reduction, and blocky effect reduction, to the main JPEG image in order to improve brightness or the picture quality or both of the main JPEG image (i.e., in the low illuminance state). To this end, the image correction unit 760 may comprise, for example, a Huffman decoder (refer to 762 shown in FIG. 4), an improving algorithm application unit (refer to 764 shown in FIG. 4), and a Huffman encoder (refer to 766 shown in FIG. 4).

That is, the image correction unit 760 decodes the main JPEG image into 8×8 block data (i.e., a minimum coded unit) using a Huffman decoding method. Next, the image correction unit 760 adjusts a DC/AC coefficient by applying the improving algorithm to the 8×8 block data. In the process of applying the improving algorithm to the 8×8 block data, an image area is separated from the block data based on a DC/AC threshold value and the DC/AC coefficient is then adjusted, thereby being capable of enhancing brightness (brightness enhancement). Second, the DC/AC coefficient can be adjusted or controlled in order to reduce noise (noise reduction). Finally, an AC coefficient can be adjusted in order to reduce blocky noise (blocky effect reduction).

As described above, the image correction unit 760 according to the present embodiment is configured to remove noise by decoding an image on a block-data basis. Accordingly, the time taken for correction can be reduced as compared with a case where an image is fully decoded and corrected. The 8×8 block data are a minimum block unit to which the improving algorithm can apply. It is to be noted that when the minimum block unit is changed, a corresponding block data size can be changed.

The block data to which the improving algorithm has been applied are encoded using the Huffman encoding method, and so a main JPEG image with improved brightness or picture quality or both (i.e., a corrected and processed main JPEG image) can be created. The main JPEG image corrected and processed by the image correction unit 760 as described above is transferred to the file generation unit 770.

Accordingly, when the main JPEG image received from the camera module is in the low illuminance state, the file generation unit 770 of the JPEG file generation apparatus according to the present embodiment creates a JPEG image file having a JPEG format using the thumbnail JPEG image and the main JPEG image corrected and processed by the image correction unit 760.

If, as a result of the determination, the illuminance value of the main JPEG image is determined to exceed the preset reference value, the illuminance determination unit 750 transfers the received main JPEG image to the file generation unit 770 without change (refer to <Path 1> shown in FIG. 4). In this case, the file generation unit 770 of the JPEG file generation apparatus according to the present embodiment creates a JPEG image file having a JPEG format using the main JPEG image (i.e., the raw main JPEG image on which the image correction processing using the image correction unit 760 has not been performed) and the thumbnail JPEG image.

A method of generating the JPEG image file using the thumbnail JPEG image and the correction-processed JPEG image (or the raw main JPEG image) is described below with reference to, for example, FIG. 14. FIG. 14 is a diagram showing the formats of a thumbnail JPEG image file, a JPEG header, and a JPEG image file created according to an embodiment of this document.

The file generation unit 770 receives thumbnail JPEG image data created by the thumbnail JPEG image generation unit 740 and creates a thumbnail JPEG image file (refer to (c) of FIG. 14), comprising the thumbnail JPEG image data (refer to 'Thumbnail JPEG Image Data' shown in (c) of FIG. 14) and a thumbnail JPEG header (refer to 'Thumbnail JPEG Header' shown in (c) of FIG. 14).

Here, the thumbnail JPEG header can be created based on an information segment (refer to FIG. 12) which is included in frame data and transmitted. In an alternative, the thumbnail JPEG header may be created by acquiring and calculating basic information for generating the thumbnail JPEG header from thumbnail image data.

In another alternative, the file generation unit 770 may create the thumbnail JPEG header based on the information segment or main JPEG image data. In this case, the thumbnail JPEG image file is also inserted into the created JPEG header (refer to (b) of FIG. 14). Through this process, the file generation unit 770 can create a JPEG image file (refer to (a) of FIG. 14), comprising the JPEG header (refer to 'JPEG Header' shown in (a) of FIG. 14) and the correction-processed (or raw) main JPEG image data (refer to 'JPEG main Image data' shown in (a) of FIG. 14).

The JPEG file generation method and apparatus according to the embodiment of this document (hereinafter referred to as a 'first embodiment') has been described above with reference to FIGS. 3 to 5. Hereinafter, a method and apparatus for generating a JPEG file according to another embodiment of this document (hereinafter referred to as a 'second embodiment') and a method and apparatus for generating a JPEG file according to yet another embodiment of this document (hereinafter referred to as a 'third embodiment') are sequentially described with reference to FIGS. 6 to 8 and FIGS. 9 to 11, respectively.

The JPEG file generation method and the JPEG file generation apparatus according to the second and third embodiments may be almost identical with those of the first embodiment. The first, second, and third embodiments differ in that what data are included in frame data transmitted from the camera module to the host system.

In other words, in the first embodiment, "the main JPEG image" is included in the frame data received from the camera module. Meanwhile, it is assumed that in the second embodiment, "thumbnail image data" on which the JPEG compression processing has not been performed, together with "the main JPEG image", are included in the frame data and in the third embodiment, "a thumbnail JPEG image" on which the JPEG compression processing has been performed, together with "the main JPEG image", are included in the frame data. Processes of the JPEG file generation method and a construction of the JPEG file generation apparatus slightly differ in the first, second, and third embodiments because of such differences.

Accordingly, differences between the first embodiment and the second and third embodiments are chiefly described, and a description of portions which overlap with those of the first embodiment or may apply in the same manner as the first embodiment is omitted.

Figure 6:
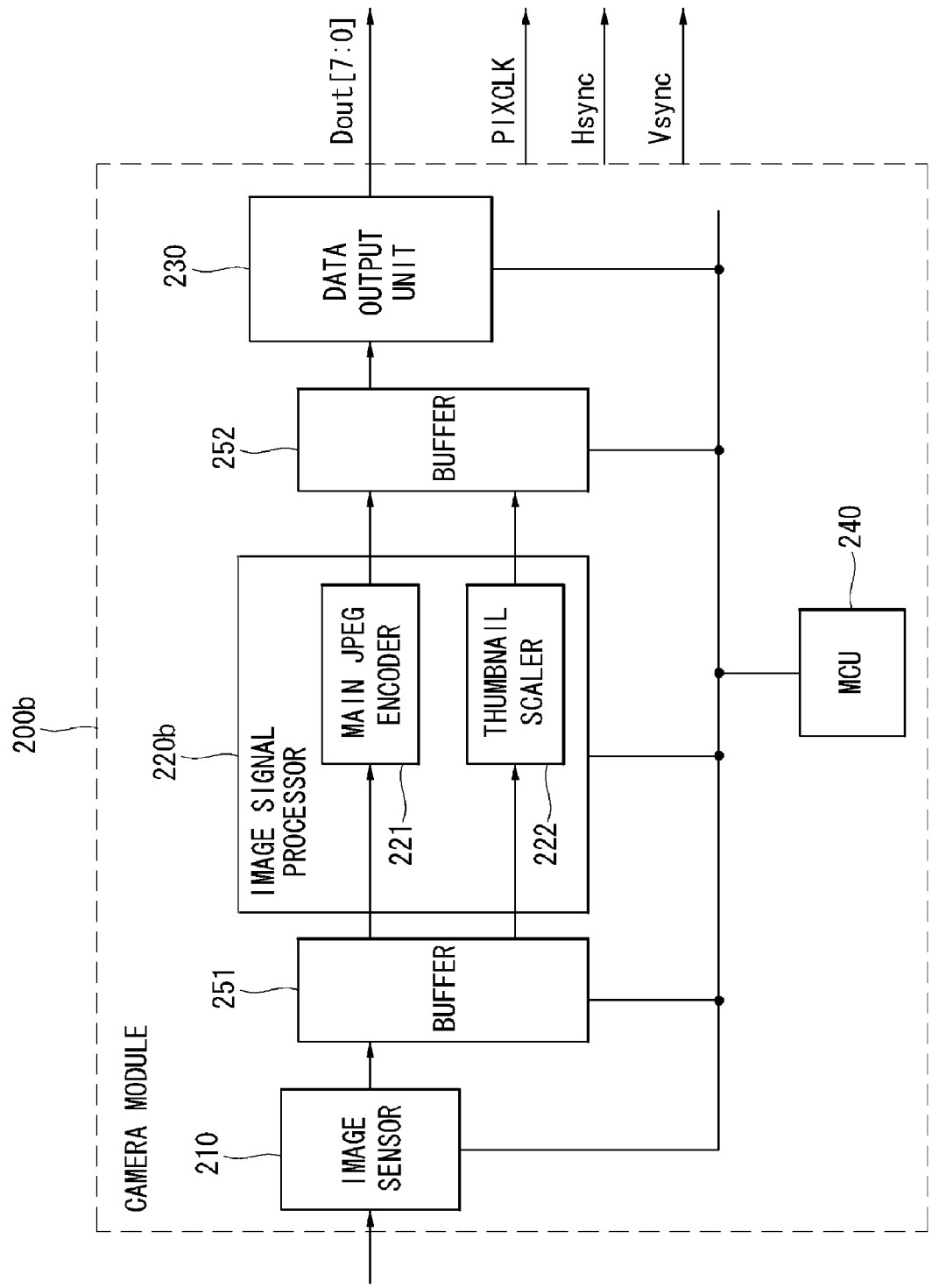
FIG. 6 is a block diagram of a camera module according to another embodiment of this document.
Figure 7:
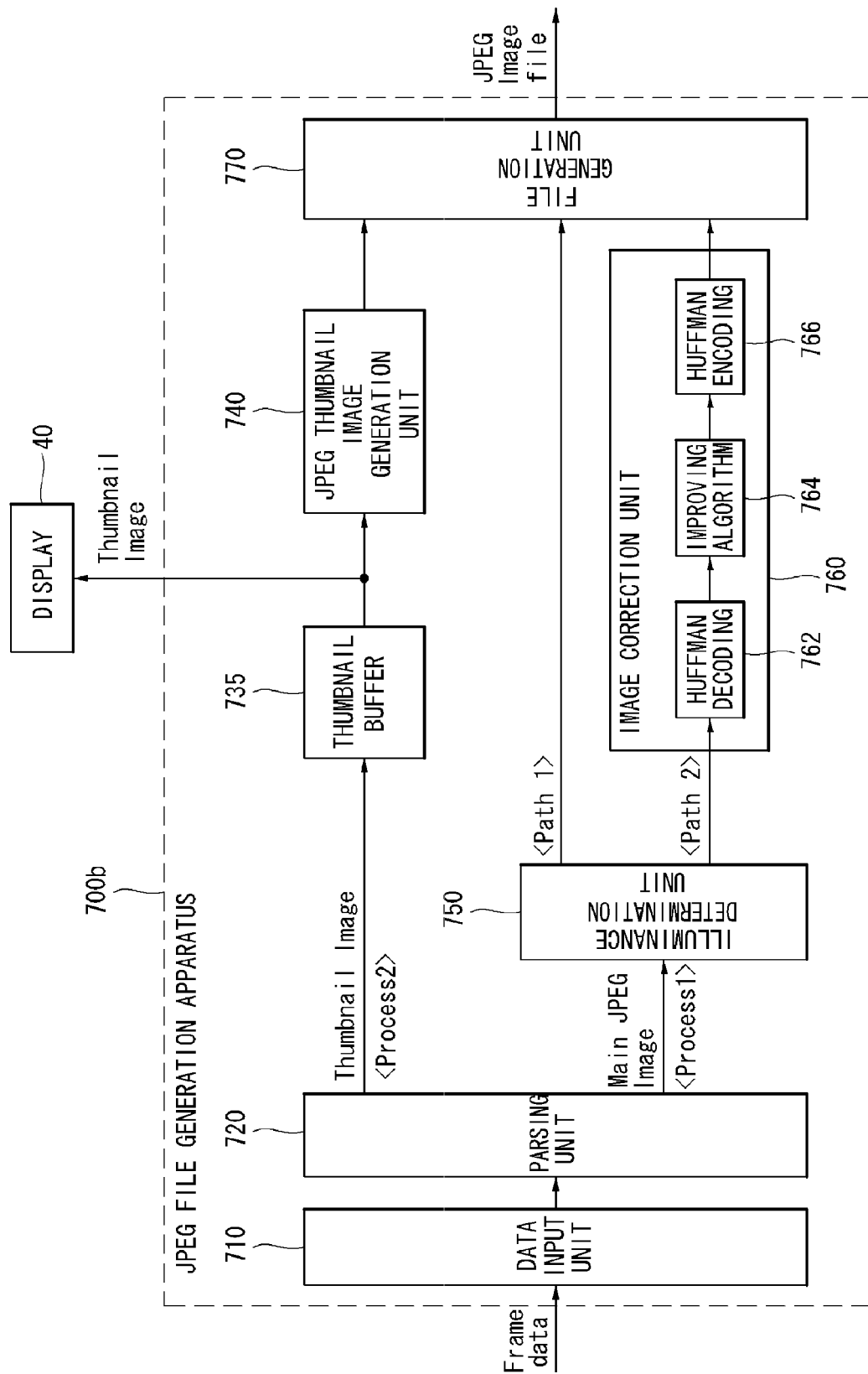
FIG. 7 is a block diagram of an apparatus for generating a JPEG file according to another embodiment of this document.

The second embodiment is described below with reference to FIGS. 6 to 8. FIG. 6 is a block diagram of a camera module according to another embodiment of this document, FIG. 7 is a block diagram of an apparatus for generating a JPEG file according to another embodiment of this document, and FIG. 8 is a flowchart illustrating a method of generating a JPEG file according to another embodiment of this document.

Figure 8:
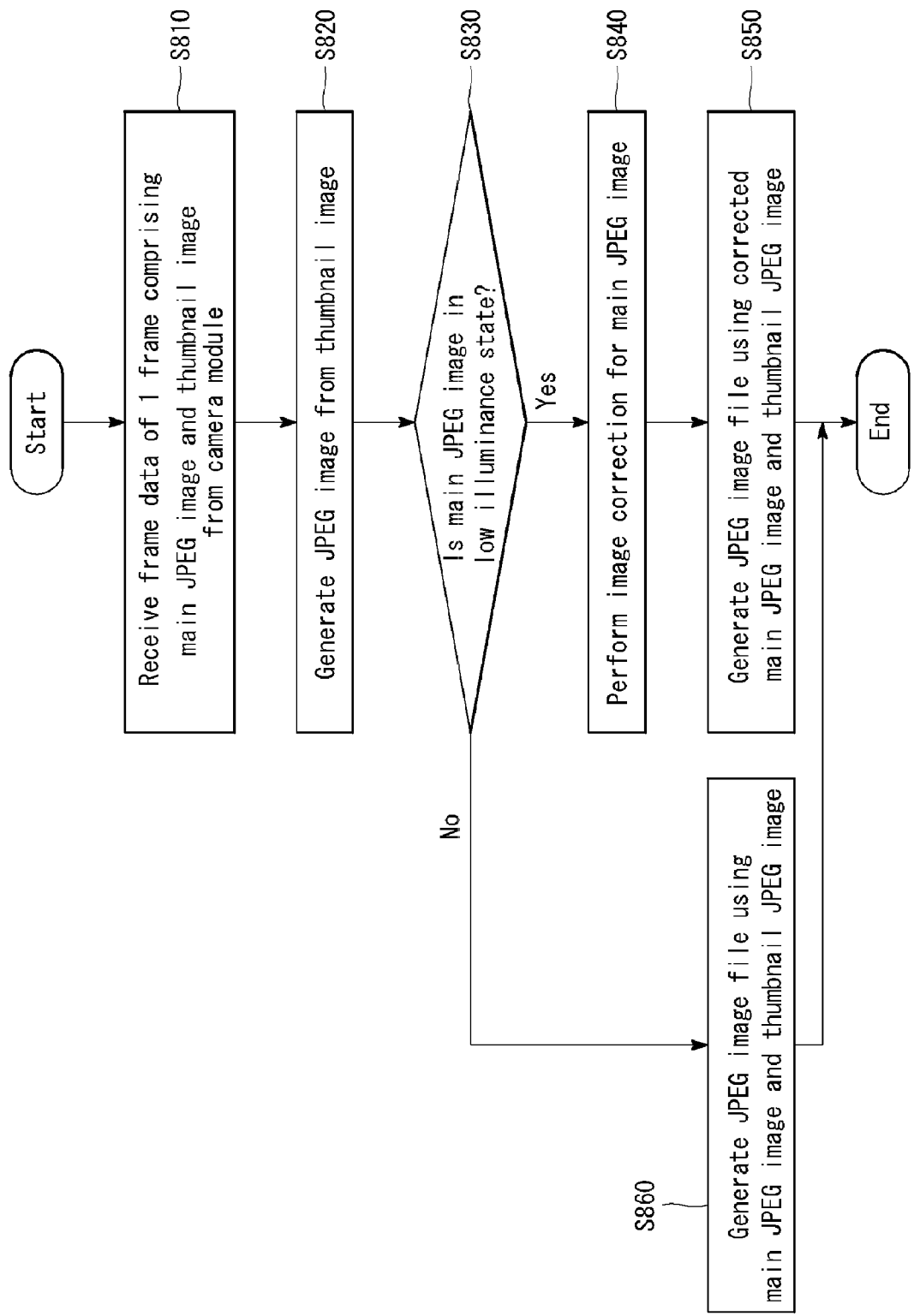
FIG. 8 is a flowchart illustrating a method of generating a JPEG file according to another embodiment of this document.

A flowchart illustrating the JPEG file generation method performed by the JPEG file generation apparatus according to the second embodiment may be identical with the flowchart shown in FIG. 8.

First, the JPEG file generation apparatus 700*b* receives frame data of 1 frame, comprising a main JPEG image and a thumbnail image, from the camera module 200*b* [S810].

As a first premise process for generating a JPEG image file, a thumbnail JPEG image is generated from the thumbnail image included in the received frame data [S820].

As a second premise process for generating the JPEG image file, it is determined whether the main JPEG image received from the camera module is in a low illuminance state [S830]. If, as a result of the determination, the main JPEG image is in a low illuminance state, the image correction processing for the main JPEG image is performed [S840].

Here, the two premise processes for generating the JPEG image file (i.e., steps S820 and S840) may be performed in parallel unlike in the sequence shown in FIG. 8.

Accordingly, when the main JPEG image received from the camera module is in a low illuminance state, the JPEG image file is finally generated using the JPEG image corrected and processed at step S840 and the thumbnail JPEG image generated at step S820 [S850]. However, when the main JPEG image received from the camera module is not in a low illuminance state, the image correction processing at step S840 is not performed, and the JPEG image file is finally generated using the raw main JPEG image (i.e., the main JPEG image received from the camera module) and the thumbnail JPEG image generated at step S820 [S860].

When comparing the JPEG file generation method according to the flowchart of FIG. 8 with the JPEG file generation method according to the flowchart of FIG. 5, the steps S830, S840, S850, and S860 except for the steps S810 and S820 are identical with the steps S530, S540, S550, and S560. This is because, unlike the frame data inputted from the camera module to the JPEG file generation apparatus at step S510 shown in FIG. 5, the frame data received at step S810 shown in FIG. 8 further comprises the thumbnail image in addition to the main JPEG image.

That is, in the second embodiment, the camera module further generates the thumbnail image other than the main JPEG image and sends the generated thumbnail image to the host system. To this end, the camera module 200*b* of FIG. 6 according to the second embodiment further comprises a thumbnail scaler 222 within an image signal processor 220*b* as compared with the camera module 200*a* of FIG. 3 according to the first embodiment. In other words, the camera module 200*b* of FIG. 6 further comprises the thumbnail scaler 222 in addition to a main JPEG encoder 221. Accordingly, the frame data, comprising the main JPEG image and the thumbnail image for a raw image, can be sent to the host system.

Figure 12:
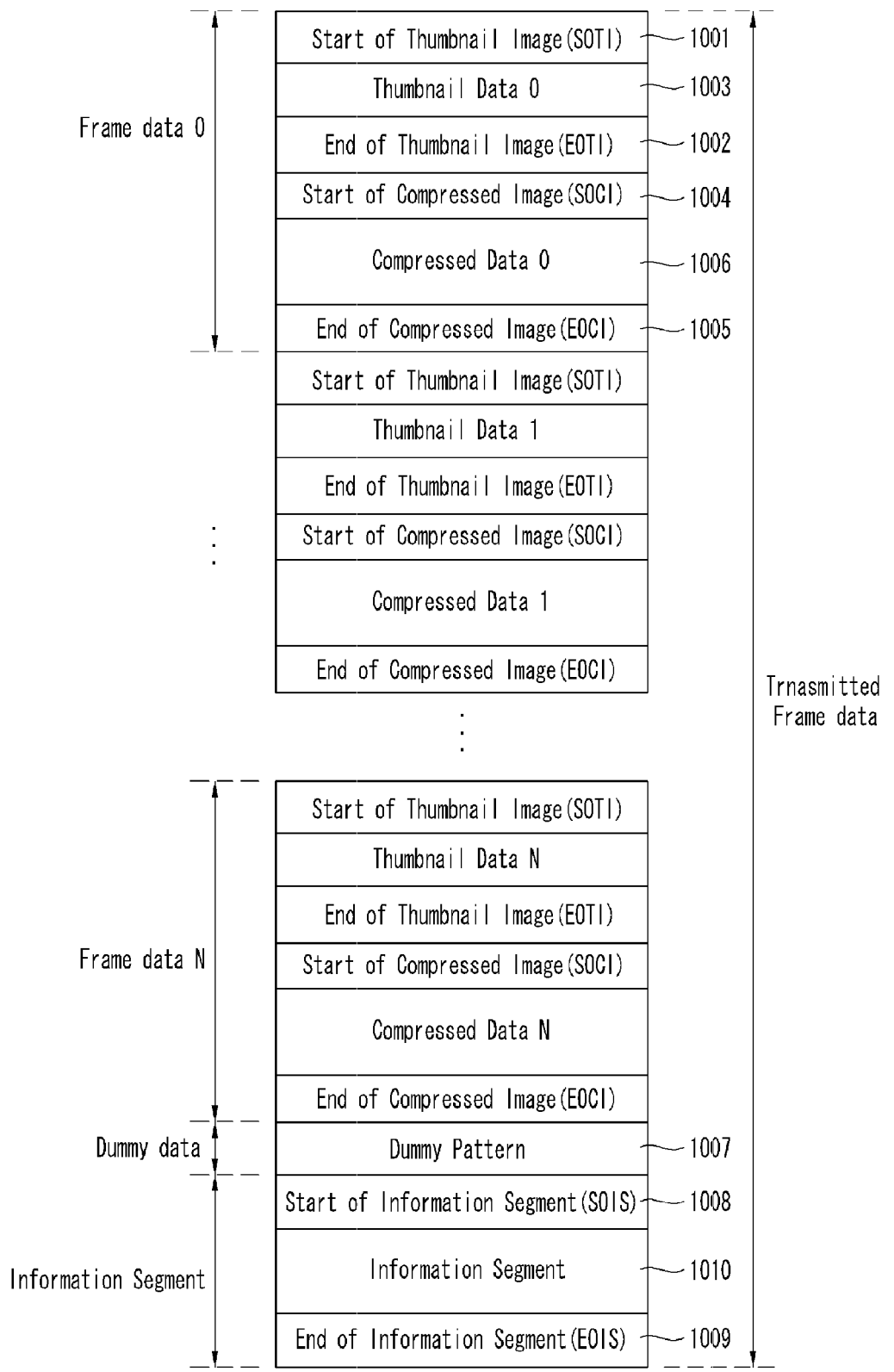
FIG. 12 is a diagram showing an example of the format of frame data outputted from the camera module shown in FIG. 6.

Here, the frame data sent from the camera module 200*b* to the host system may have a transmission format, such as that shown in FIG. 12. FIG. 12 is a diagram showing an example of the format of frame data outputted from the camera module shown in FIG. 6. The transmission format of the frame data is described below with reference to FIG. 12.

Referring to FIG. 12, frame data of 1 frame that will be sent to the host system comprises a total number of (N+1) unit frame data ranging from frame data 0 (refer to 'Frame data 0' shown in FIG. 12) to frame data N (refer to 'Frame data N' shown in FIG. 12).

For example, in the case of the frame data 0, one unit frame data comprises part of thumbnail image data (refer to 1003 shown in FIG. 12), part of main JPEG image data (refer to 1006 shown in FIG. 12), and predetermined markers (refer to 1001, 1002, 1004, and 1005 shown in FIG. 12) which will be used as dividers between the thumbnail image data and the main JPEG image data.

It is, however, to be noted that in some embodiments, the transmission format may be modified in various ways. For example, although a total of the four markers are inserted into the single unit frame data in FIG. 12, 1 or 2 will be enough for the number of markers if they are only used to distinguish the thumbnail image data and the main JPEG image data. Further, the flowchart in which the thumbnail image data and the main JPEG image data are inserted into the one unit frame data may be opposite to that shown in FIG. 12. In addition, the thumbnail image data and the main JPEG image data may not be necessarily inserted between intermediate portions of the one unit frame data as in FIG. 12.

Further, in the transmission format shown in FIG. 12, dummy data 1007 and information segments 1008, 1009, and 1010 are included at the end of the one unit frame data. The dummy data 1007 is insignificant data inserted for frame synchronization according to the vertical synchronization signal (Vsync) (refer to FIG. 13).

According to this document, the main JPEG image data may not have the same data section as frame synchronization for image data before its compression processing because it is JPEG-compressed image data. The dummy data 1007 is used to solve the synchronization mismatching problem.

The information segment 1010 comprises information necessary to generate the JPEG header of the JPEG image file. The information necessary to generate the JPEG header may comprise frame information about an image of 1 frame, such as the size of raw image data, the size of JPEG image data, a frame length, or the size of thumbnail image data. The information necessary to generate the JPEG header may, alternatively or additionally, comprise encoding information (e.g., a quantization table, a Huffman table, and a DCT signal processing method) that will be used to encode image data.

It is also to be noted that although the information segments are included in the transmission format of the frame data in FIG. 12, the information segments may not be necessarily included in the transmission format. The information segments are used as basic information for generating a JPEG header or a thumbnail JPEG header subsequently. This is because the basic information for generating the header cannot be directly acquired on the host system side.

It is assumed in FIG. 12 that the main JPEG image and the thumbnail image are included in the frame data according to the second embodiment. It will be evident that the thumbnail image will not be included in the transmission format in the first embodiment, and a thumbnail JPEG image instead of the thumbnail image will be included in the transmission format in the third embodiment.

The frame data having the above-described transmission format, as shown in FIG. 13, is transmitted from the camera module to the JPEG file generation apparatus in synchronism with a pixel clock, a vertical synchronization signal (i.e., a frame synchronization signal), and a horizontal synchronization signal (i.e., a line synchronization signal). The transmitted frame data are read in the data input unit 710 of the JPEG file generation apparatus in synchronism with the pixel clock, the vertical synchronization signal, and the horizontal synchronization signal.

The JPEG file generation apparatus 700b shown in FIG. 7 further comprises a parsing unit 720 as compared with the JPEG file generation apparatus 700a shown in FIG. 4, but does not comprise the thumbnail image generation unit 730 shown in FIG. 4. This is because the thumbnail image is further included in the frame data received from the camera module 200b shown in FIG. 6 in addition to the main JPEG image.

The parsing unit 720 of the JPEG file generation apparatus 700b shown in FIG. 7 (this is true of FIG. 10 to be described later) functions to distinguish the main JPEG image and the thumbnail image included in the received frame data. Such a data distinction can be performed based on markers included in the received frame data.

Since the frame data are transmitted with the thumbnail image added thereto as described above, the JPEG file generation apparatus 700b shown in FIG. 7 does not comprise the thumbnail image generation unit 730 shown in FIG. 4 as a requisite constituent element. The remaining elements of the JPEG file generation apparatus 700b shown in FIG. 7 and the functions thereof are identical with those of the JPEG file generation apparatus 700a shown in FIG. 4.

Figure 9:
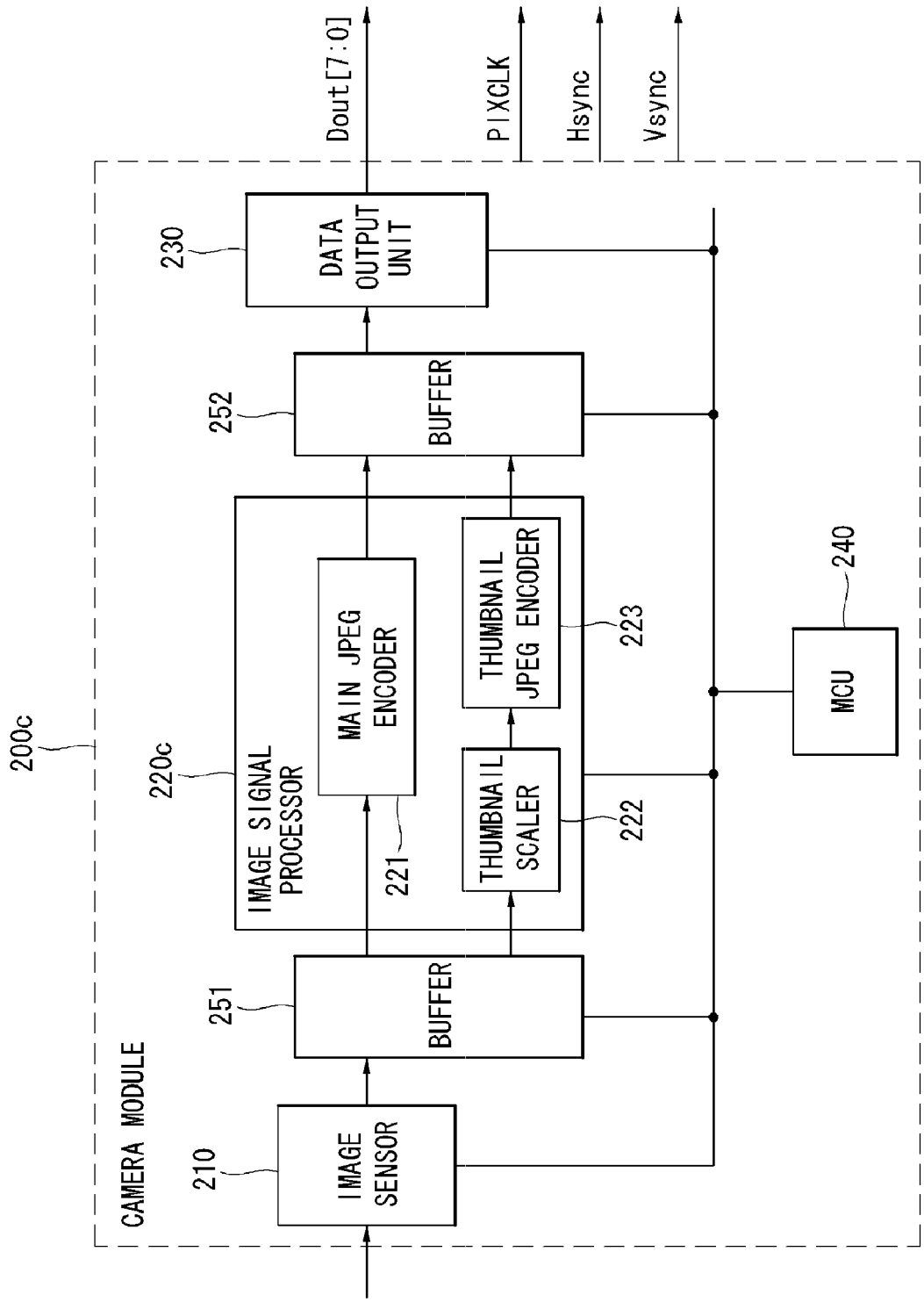
FIG. 9 is a block diagram of a camera module according to yet another embodiment of this document.
Figure 10:
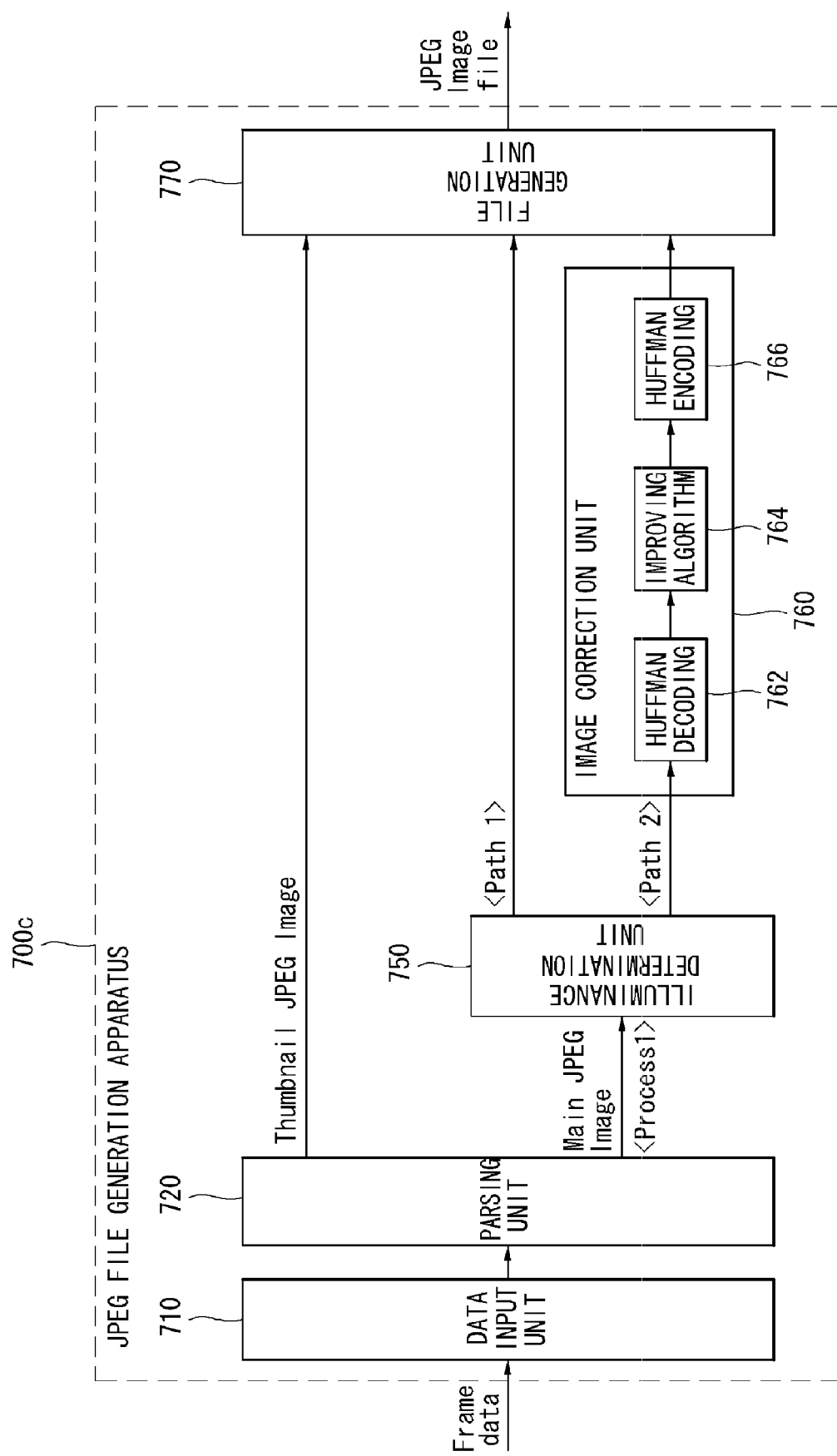
FIG. 10 is a block diagram of an apparatus for generating a JPEG file according to yet another embodiment of this document.

The third embodiment is described below with reference to FIGS. 9 to 11. FIG. 9 is a block diagram of a camera module according to yet another embodiment of this document, FIG. 10 is a block diagram of an apparatus for generating a JPEG file according to yet another embodiment of this document, and FIG. 11 is a flowchart illustrating a method of generating a JPEG file according to yet another embodiment of this document.

Figure 11:
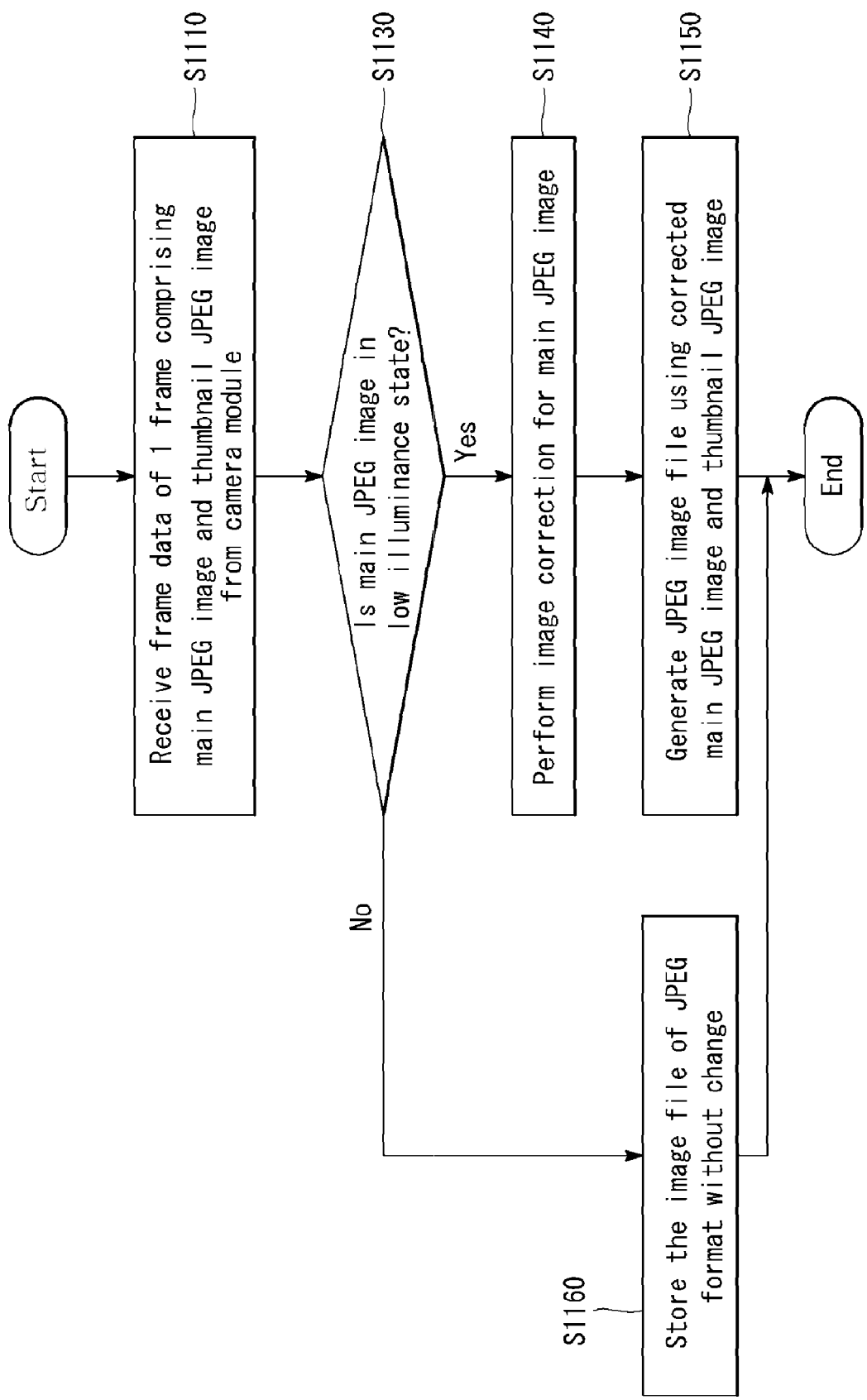
FIG. 11 is a flowchart illustrating a method of generating a JPEG file according to yet another embodiment of this document.

A flowchart illustrating the JPEG file generation method performed by the JPEG file generation apparatus according to the third embodiment may be identical with the flowchart shown in FIG. 11.

First, the JPEG file generation apparatus 700c receives frame data of 1 frame, comprising a main JPEG image and a thumbnail JPEG image, from the camera module 200c [S1110].

It is determined whether the main JPEG image received from the camera module is in a low illuminance state [S1130]. If, as a result of the determination, the main JPEG image is determined to be in a low illuminance state, the JPEG file generation apparatus 700c performs the image correction processing for the main JPEG image [S1140].

Next, a JPEG image file is finally generated using the JPEG image corrected and processed at step S1140 and the thumbnail JPEG image transferred at step S1110 [S1150]. However, if, as a result of the determination, the main JPEG image is determined not to be in a low illuminance state, the image correction processing at step S1140 is not performed, and the raw main JPEG image having a JPEG format and the thumbnail JPEG image are stored in the form of a file without change [S1160].

The JPEG file generation method according to the flowchart shown in FIG. 11 is almost identical with the JPEG file generation method according to the flowcharts shown in FIG. 5 or 8. The JPEG file generation method according to the flowchart shown in FIG. 11 does not include a step of generating the thumbnail JPEG image, such as the step S520 of FIG. 5 or the step S820 of FIG. 8, because the thumbnail JPEG image is already included in the frame data received from the camera module.

For the above reason, the camera module 200c shown in FIG. 9 further comprises a thumbnail JPEG encoder 223 within an image signal processor 220c in addition to a main JPEG encoder 221 and a thumbnail scaler 222. Further, the JPEG file generation apparatus 700c shown in FIG. 10 does not include the thumbnail image generation unit 730, the thumbnail buffer 735, and the thumbnail JPEG image generation unit 740 shown in FIG. 4 or 7 because the thumbnail JPEG image is directly transferred with it being included in the frame data.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A method of generating a compressed image file at a mobile terminal, the method comprising:
    receiving frame data comprising encoded image data of at least one frame of a raw image;
    generating first encoded thumbnail image data of the encoded image data;
    correcting the encoded image data and generating the compressed image file by using the corrected encoded image data and the first encoded thumbnail image data when the encoded image data has an illuminance value lower than a preset reference value; and
    generating the compressed image file by using the encoded image data and the first encoded thumbnail image data when the encoded image data has an illuminance value greater than the preset reference value.

2. The method of claim 1, wherein correcting the encoded image data comprises:
    decoding the encoded image data on a data-block basis to output at least one decoded data block;
    applying an improving algorithm to the at least one decoded data block, wherein the improving algorithm comprises at least a brightness enhancement, a noise reduction, or a blocky effect reduction; and
    encoding the at least one decoded block data to which the improving algorithm was applied to generate the corrected image data.

3. The method of claim 2, wherein the encoded image data is JPEG image data.

4. The method of claim 2, wherein the at least one decoded data block is decoded using a Huffman decoding method and encoded using a Huffman encoding method.

5. The method of claim 1, wherein generating the first encoded thumbnail image data comprises:
    decoding the encoded image data to generate decoded image data;
    scaling the decoded image data to generate scaled image data of a thumbnail-sized image; and
    encoding the scaled image data to generate the first encoded thumbnail image data.

6. The method of claim 5, wherein the scaled image data comprises colors that are converted into a Red-Green-Blue (RGB) format and a display screen displays the thumbnail-sized image of the scaled image data using the RGB formatted colors.

7. The method of claim 5, wherein correcting the encoded image data and generating the scaled image data are performed substantially in parallel.

8. The method of claim 1, wherein the received frame data further comprises thumbnail image data of the at least one frame of the raw image.

9. The method of claim 8, further comprising:
    encoding the thumbnail image data of the at least one frame of the raw image to generate the first encoded thumbnail image data.

10. The method of claim 8, wherein the received frame data further comprises second encoded thumbnail image data of the at least one frame of the raw image.

11. The method of claim 10, wherein generating the compressed image file comprises using the second encoded thumbnail image data received with the frame data.

12. The method of claim 1, wherein the frame data is generated by and received from a camera module.

13. The method of claim 1, further comprising:
    receiving the illuminance value of the encoded image data from a camera module.

14. The method of claim 1, further comprising:
    calculating the illuminance value from the encoded image data.

15. An apparatus for generating a compressed image file, comprising:
    a storage unit for storing frame data comprising compression-coded image data of at least one frame of a raw image;
    an illuminance determination unit for determining whether the stored compression-coded image data has an illuminance value lower than a preset reference value;
    an image correction unit for correcting the stored compression-coded image data when the illuminance determination unit determines that the illuminance value of the stored compression-coded image data is lower than the preset reference value; and
    a file generation unit for generating the compressed image file, wherein the file generation unit generates the compressed image file comprising the corrected compression-coded image data and first encoded thumbnail image data when the illuminance value is lower than the preset reference value and generates the compressed image file comprising the compression-coded image data and the first encoded thumbnail image data when the illuminance value is greater than the preset reference value.

16. The apparatus of claim 15, wherein the image correction unit comprises:
    a decoder for decoding the compression-coded image data on a block-data basis to output at least one decoded data block;
    an algorithm application unit for applying an improving algorithm to the at least one decoded data block, wherein the improving algorithm comprises at least a brightness enhancement, a noise reduction, or a blocky effect reduction; and
    an encoder for encoding the at least one decoded data block to which the improving algorithm was applied.

17. The apparatus of claim 16, wherein:
    the compression-coded image data is JPEG image data,
    the decoder is a Huffman decoder, and
    the encoder is a Huffman encoder.

18. The apparatus of claim 15, further comprising:
    a decoder for decoding the compression-coded image data to generate decoded image data;
    a scaler for scaling the decoded image data to generate scaled image data of a thumbnail-sized image;
    an encoder for generating the first encoded thumbnail image data by encoding the scaled image data.

19. The apparatus of claim 18, further comprising:
    a color conversion unit for converting color data of the scaled image data into a Red-Green-Blue (RGB) format, wherein the scaled image data comprises colors that are converted by the color conversion unit into the RGB format; and
    a display screen for displaying the thumbnail-sized image of the scaled image data using the RGB formatted colors.

20. The apparatus of claim 18, wherein the received frame data further comprises thumbnail image data of the at least one frame of the raw image.

21. The apparatus of claim 20, wherein the encoder encodes the thumbnail image data to generate the first encoded thumbnail image data.

22. The apparatus of claim 15, wherein the frame data further comprises second encoded thumbnail image data of the at least one frame of the raw image.

23. The apparatus of claim 22, wherein the file generation unit generates the compressed image file using the second encoded thumbnail image data received with the frame data.

24. The apparatus of claim 15, wherein the frame data is generated by and received from a camera module.

25. The method of claim 15, wherein the illuminance determination unit receives the illuminance value of the stored compression-coded image data from a camera module.

26. The method of claim 15, wherein the illuminance determination unit calculates the illuminance value from the stored compression-coded image data.

27. The method of claim 15, further comprising:
a thumbnail image generation unit for generating thumbnail image data using the corrected compression-coded image data.

28. A terminal, comprising:
a camera module, wherein the camera module comprises:
  an image sensor,
  an encoder for generating compression-coded image data from a raw image of at least one frame acquired by the image sensor, and
  a data output unit for outputting frame data, wherein the frame data comprises the compression-coded image data; and
a host system connected to the camera module through an interface connection, wherein the host system comprises:
  a storage unit for storing the frame data received from the camera module,
  a thumbnail image generation unit for generating encoded thumbnail image data of the compression-coded image data,
  an illuminance determination unit for determining whether the compression-coded image data has an illuminance value lower than a preset reference value,
  an image correction unit for performing an image correction process that corrects the compression-coded image data when the illuminance determination unit determines that the illuminance value of the compression-coded image data is lower than the preset reference value, and
  a file generation unit for generating a compressed image file, wherein the compressed image file comprises the corrected compression-coded image data and the encoded thumbnail image data when the illuminance value is lower than the preset reference value and the compressed image file comprises the compression-coded image data and the encoded thumbnail image data when the illuminance value is greater than the preset reference value.

* * * * *